Sept. 15, 1964         M. WATTER ETAL         3,149,221
RESISTANCE MONITOR
Original Filed Aug. 11, 1960

INVENTORS.
Michael Watter
Edwin M. Callender
ATTORNEY

3,149,221
RESISTANCE MONITOR

Michael Watter, Washington, D.C., and Edwin M. Callender, Bala-Cynwyd, Pa., assignors to Robotron Corporation, Detroit, Mich., a corporation of Michigan
Continuation of application Ser. No. 48,911, Aug. 11, 1960. This application Mar. 7, 1962, Ser. No. 179,284
16 Claims. (Cl. 219—110)

This invention pertains to a resistance monitor for welding operations and, more particularly, to means and methods for generating information signals quantitatively related to the workpiece resistance parameters which affect resistance welding. This application is a continuation of United States Serial No. 48,911, filed August 11, 1960, which has now been abandoned.

Resistance welding is the autogenous welding of composite workpieces through fusion of parent workpiece materials. Such fusion is accomplished upon generation of heat at a welding position during the passage of electric current pulses through the series resistances of the welding position. These resistances comprise contact resistances, bulk resistances, and shunting resistances. The contact resistances arise at the interfaces between electrodes and the workpiece and between the parts of the workpiece, and vary with contact pressure and with surface conditions. Bulk resistances of materials depend upon transverse dimensions and upon resistivity-temperature characteristics. The shunting resistances vary with the proximity of parallel conductance paths. These resistances vary between workpieces and between welding positions of the same workpiece. Variations occur even during welding at a given welding position.

Determination of resistance is the problem which must be solved in order to program resistance heating for good welding. Conversely, resistance is the welding parameter which is informative of acceptable prewelding conditions and determinative of the properties of a completed weld. For these reasons, accurate and precise weld position resistance monitoring has long been actively sought by the welding sections of industry.

Conventionally, heat is developed at a welding position by current inputs in the form of alternating current pulses of variable heating effect as regulated by phase shift controlled alternating current contactors. Such pulses are alternately positive and negative, and of generally sinusoidal shape. The heating effect of the welding current is a time integral function of $I^2$ in which I varies sinusoidally with time. The temperature at the welding position is a function of the heat input, heat losses, and of thermal capacity.

Prior monitoring concepts are of two general types: the first employs an external D.C. source connected in parallel with the welding position to be investigated; the second type employs the welding current pulses themselves as a voltage source. In either case, the potential drop across the welding position is sensed as equivalent to welding position resistance. The disadvantage of the first monitoring concept is that the resistive workpiece parameters are different for the constant input than for the alternating current input of actual welding because of the great difference in magnitude and waveform. The disadvantage of the second concept is that information can only be obtained during welding current inputs.

Therefore, it is the general object of this invention to provide improved monitoring for resistance welding operations by development of a workpiece resistance signal, independent of welding current pulses, and having an effective waveform similar to the welding current waveform in order to yield workpiece resistance information indicative of workpiece resistance parameters as presented to the welding current.

According to a method of this invention, a workpiece resistance signal is derived by the steps of generating a sample pulse waveform comprising spaced pulses having an amplitude of the same order of magnitude as welding current and a duration substantially less than the duration of the welding current pulses to yield a heating effect insufficient to initiate or maintain workpiece fusion, conducting the sample pulses through the series resistances of the workpiece welding position, and generating an output signal proportional to the potentials developed across the workpiece series resistances by the sample pulses.

An illustrated preferred embodiment of a system for performing the monitoring of this invention comprises a pulse generator means synchronized with a welding current source, generating spaced, high amplitude, short duration sample pulses in a prescribed phase relationship with the welding current pulses, circuit means coupling the pulse generator means in parallel with the series resistances of the workpiece, and means connected in parallel with the series workpiece resistances generating a signal proportional to the potential difference developed thereacross by the sample pulses.

While the subject matter of this invention is particularly pointed out in the appended claims, a better understanding may be had from the following description in conjunction with the accompanying drawing wherein:

Figure 1:
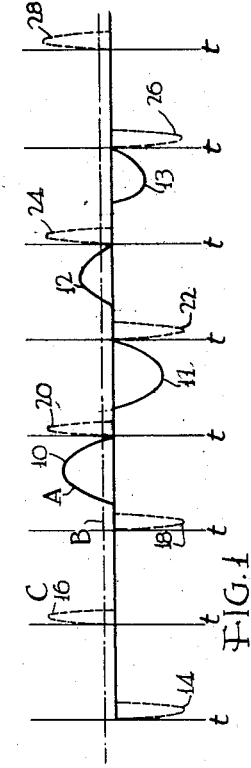
FIG. 1 is a voltage waveform diagram explanatory of basic concepts of this invention.

The waveform diagram of FIG. 1 depicts at A, the voltage waveform developed across the workpiece series resistances between welding electrodes at a welding position by the welding current. Each positive and negative welding current pulse is shown with a duration less than the total duration of a half-cycle of the power supply, as prescribed by the recovery characteristics of conventional power controls. Time bars $t$ each delineate the start of a power source half-cycle. Pulses 10 and 11 illustrate near maximum welding current pulse duration relative to the duration of power source half-cycles. Weld input pulses 12 and 13 are indicative of welding input control action whereby initiation of a welding current pulse is delayed after the start of a source half-cycle in order to reduce input power to the welding position. For this illustration, it may be assumed that curve A also represents the corresponding potential difference developed across the workpiece during transmission of weld current. As a weld resistance information signal, the voltage represented by curve A is, of course, available only during welding.

Curve B represents disassociation of welding position resistance information from welding currents by use of a D.C. potential, entirely unrelated to waveform A. However, the series resistances of a welding position are radically different when developed by direct currents than when developed by the high-amplitude pulsating welding current. Though attempts have been made in the past to extrapolate D.C. signal information to meaningful correspondence with actual resistance conditions during welding, such extrapolations have been made with the realization that any correlation was, at best, an approximation.

According to this invention, a resistance-sensing pulse waveform C is generated independently of the welding current so as to comprise short duration, high amplitude, spaced pulses 14, 16, 18, 20, 22, 24, 26, 28. In certain embodiments, as explained hereinafter, it is preferred that the sample pulse generation be synchronized with the welding current alternations and phase related therewith to yield sample pulses, as shown, at the start of and during the recovery periods between maximum duration welding current pulses.

Disassociation of the sampling waveform C from welding waveform A allows preweld investigation of welding conditions and, therefore, anticipatory control of welding conditions. As indicated by sample pulses 14, 16 and 18, sampling may be advanced sufficiently for even manual compensation to correct initial deficiencies in welding conditions. With automatic feed-back control, the sample pulse, as at 18, preceding each half-cycle input allows anticipatory control to be accomplished before the input, as at 10, of that specific half-cycle of the power source. In addition, post-welding sample pulses, as at 26 and 28, may be utilized for post-weld investigation of resistive parameters of completed welds for quality indication and recording or the like.

Workpiece fusion begins when there is a determinable minimum heat input delivered to a welding position per half-cycle of an alternating current supply; after inception, fusion may be continued at a somewhat different heat input rate. A minimum heat input rate $H_f'$, however, may be defined as necessary for inception and development of a weld. It follows that an actual heat input rate $H_w'$ equal to or exceeding $H_f'$ must be supplied by the welder. Conversely, the heat input rate $H_s'$ delivered by the sample pulses must be less than $H_f'$, according to the teachings of this invention.

A generalized pulse heat input per half-cycle, $H'$, varies directly with its amplitude A and with its duration T. It is therefore possible to determine a sample pulse shape for any given range of workpiece parameters, so that the conditions $H_s' < H_f$, and $A_s \geq A_f$ are satisfied simultaneously by making $T_s$ small in comparison with $T_f$. Here, $A_s$ and $A_f$ are defined as maximum amplitudes; $T_s$ and $T_f$ are pulse widths, in time, at half-maximum pulse amplitudes to contemplate the effect of pulse rise times.

Figure 2:
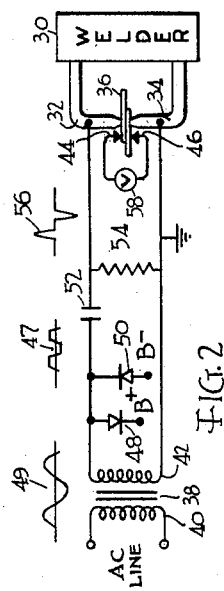
FIG. 2 illustrates a simplified system for workpiece resistance monitoring.

FIG. 2 illustrates a simplified system for generating synchronized sampling pulses for resistance monitoring. A resistance welder is shown diagrammatically at 30, as having welding electrodes 32 and 34 in thermal and electrical contact with a composite workpiece 36. Successful resistance welding of workpieces, especially the thinner gauges, depends upon a knowledge of the series resistance across the welding position defined as between the welding electrodes 32 and 34. Here, the aforesaid high amplitude short duration sampling pulses are generated by an elementary system comprising an input transformer 38 having a primary 40 energized from an alternating current power supply and a secondary 42 coupled in parallel across the series resistances of the welding position via terminal connections 44 and 46 to the electrodes 32, 34. The waveform 49 developed across secondary 42 is sinusoidal and is transformed into a square wave configuration 47 by means of diode limiters 48 and 50 which clip the sinusoidal signal at upper and lower limits prescribed by the B+ and the B− reference voltages. The square waveform is thereafter differentiated by the network of capacitor 52 and resistor 54 to appear as spaced relatively high amplitude short duration pulses 56. The potential developed across the series resistances of the welding position may be sensed and indicated by means of a peak voltage indicating meter 58, coupled in parallel with the series resistances of the workpiece. The desired shape for the pulse waveform 56 may be developed by choice of the primary-secondary turns ratio of transformer 38 and by choice of the RC time constant of differentiation network 52, 54 and the workpiece resistance.

Uniquely, according to this invention, the sample pulse waveform 56 comprises spaced pulses having amplitudes substantially equal to or exceeding peak amplitudes of the welding waveform and individual pulse durations substantially less than sufficient for initiation of fusion of the workpiece materials. This sampling waveform senses the same conditions of resistance across the welding position as does the welding current waveform. The several series workpiece resistances are a function of the frequency components of the sensing signal and even through the sampling pulses of wave form 56 are spaced further apart in time than the current welding pulses, their composite frequency components are very similar.

With such simplified systems as that of FIG. 2, various relationships between workpiece resistance signal values and welding parameters may be investigated and the data compiled. Thereafter, it is only necessary to compare the prewelding resistance signal from an actual workpiece welding position with these data to determine the correct welder control settings—electrode pressure, percent heat, transformer tap, sequence, etc.—which assure attainment of an acceptable weld.

In addition, the concepts of this invention may be utilized to determine the quality of finished welds upon compilation of the correspondence between weld nugget parameters and resistance signal values. For example, insufficient weld nugget development displaces only a smaller portion of the interface contact resistance than does a weld of acceptable diameter; conversely, a splash weld accompanied by the extrusion of molten metal between adjacent workpiece facing surfaces is indicated by low series resistance across a welding position. Significantly, the high amplitude short duration sampling pulses allow post-fusion investigation without remelting of the weld nugget bond.

Figure 3:
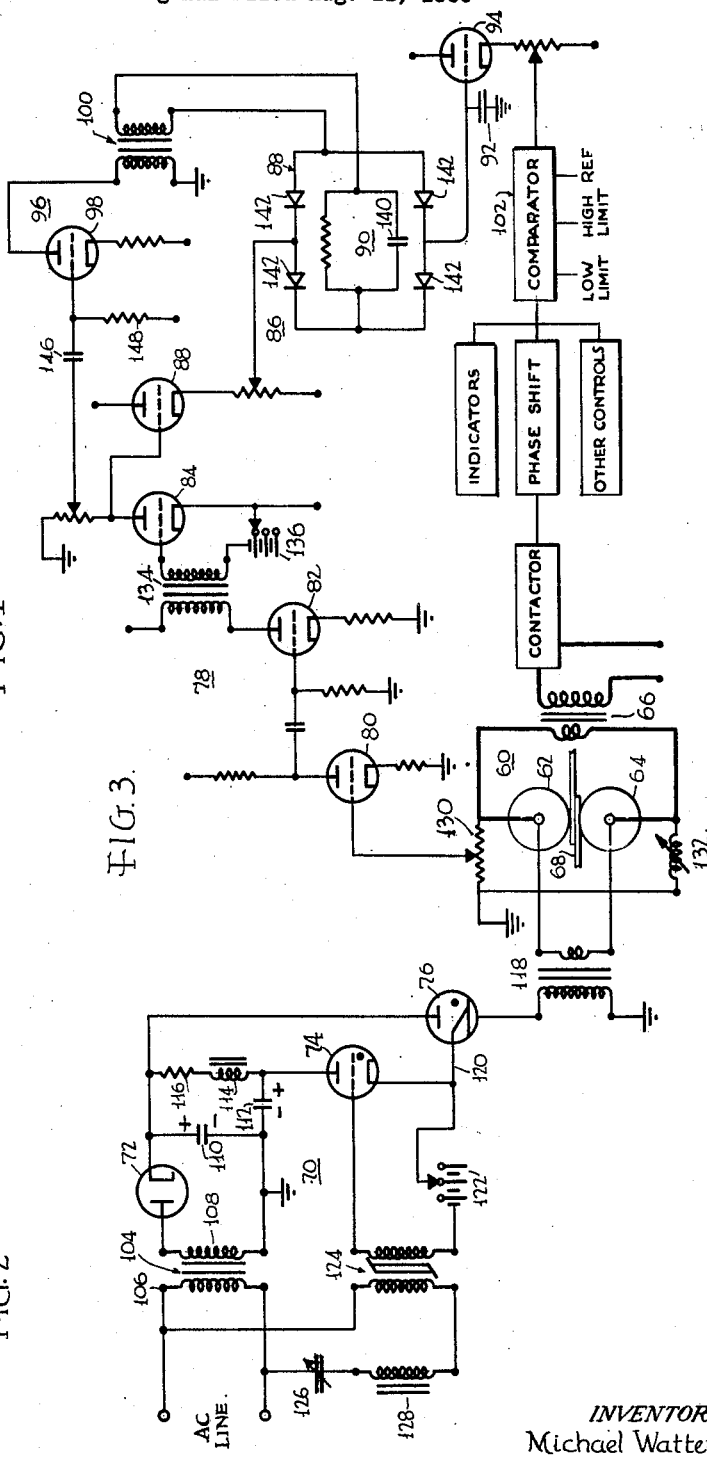
FIG. 3 illustrates a preferred system for generating and utilizing resistance monitoring signals, according to this invention.

With reference now to FIG. 3, a preferred system, according to this invention, is illustrated wherein monitoring continues during the actual welding operation and the resistance signal information is used to control discrete welding current inputs. While other systems have been proposed for varying welding current input during a welding operation, they have depended upon information generated by the welding current itself. Obviously, such prior systems can provide no control for single half-cycle welds and no effective control for other short duration operations. With this system, however, information is obtained before each weld current input and is utilized immediately to adjust the welding conditions before each weld current input. Therefore, control may be applied effectively to even the shortest duration welding operation welding operations as in joining air foil gauge sandwich structures.

The embodiment of FIG. 3 is shown in conjunction with a roller welder 60, including roller electrodes 62, 64 and welding transformer 66. A composite workpiece 68 is shown in position between the roller electrodes. Major components of the embodiment include: sample pulse generator 70 comprising the circuits associated with diode 72, thyratron 74 and ignition 76; resistance signal generator 78, including the circuits of amplifiers 80, 82 and triode 84; output signal generator 86, including the circuits of cathode follower 88, gate 90, memory capacitory 92, and cathode follower 94; and gating pulse generator 96, including the circuits of triode 98 and gating transformer 100.

The function of the sample pulse generator 70 is to produce sample pulses, of the type illustrated in FIG. 1, synchronously with respect to alternations of the welding current. The resistive signal generated by the sample pulses is sensed, amplified and shaped by resistance signal generator 78 and fed through gate 90 to memory capacitor 92. Gate 90 is controlled in synchronism with the resistance signal waveform by gating pulse generator 96 so that the potential stored on memory capacitor 92 is adjusted bidirectionally during variations of the series resistances across the workpiece position. Therefore, the potential stored on capacitor 92 is a demodulated, series resistance equivalent, voltage quantitatively related to dynamic parameters at the welding position which affect weld quality. Cathode follower 94 provides for a low impedance output signal proportional to the potential stored on memory capacitor 92. At comparator 102, the output signal may be compared with a reference signal input and with high and low limit signals. Finally, a comparision signal may be supplied to one or more of the several utilization circuits indicated in the figure for control of welding current inputs, for control of electrode pressure, and for indication of workpiece conditions. Examples of an applicable comparison circuit and of a phase shift contactor control are described in U.S. Patent 2,848,595 along with a more complete discussion of weld position resistance variations.

Sample pulse generator 70 comprises an input transformer 104 having a primary 106 connected across the AC line and to the same power source across which welding transformer 66 is coupled. Input transformer secondary 108 is coupled from the reference potential ground, through a half-wave rectifier 72 to a parallel arrangement of capacitor 110 and the series circuit of capacitor 112, inductance 114, and resistor 116. Capacitors 110 and 112 are charged in parallel as indicated. Connected in series between the positive terminal of capacitor 10 and ground are an ignitron 76 and the primary of transformer 118. The ignition electrode 120 of ignitron 76 is controlled by the condition of thyratron 74 connected to the positive terminal of capacitor 112. A bias potential source 122 biases ignition electrode 120, normally holding off conduction by ignitron 76.

A saturable core pulse transformer 124 is coupled between the grid-cathode circuit of thyratron 74 and the AC line. Input to the primary of transformer 124 is via variable capacitor 126 and inductance 128. By selection of inductance 128 and condition of variable capacitor 126, the phase position of saturation of transformer 124 may be controlled relative to the phase of the AC line and hence relative to the phase of the welding current. Upon saturation, the thyratron bias is overcome, allowing discharge of capacitor 112 through thyratron 74 and ignition electrode 120, thereby initiating conduction by ignitron 76 and discharge therethrough of the charge stored upon capacitor 110. Each discharge through the primary of transformer 118 results in induction of a sharp sampling pulse in the secondary of transformer 118, coupled in parallel with the series resistances of the workpiece welding position between electrodes 60 and 64. A sharp rise time for the sampling pulse is assured by the low impedance discharge path for capacitor 110 and the duration may be controlled by the size of the latter capacitor. By empirical adjustment of variable capacitor 126, the sample pulse is phased to occur during the initial portion of each cycle of welding current supply to workpiece 68 when no welding voltage is developed, as described in connection with FIG. 1 above.

Due to the half-wave rectification, the sample pulse generator 70 develops but one sample pulse per cycle, e.g., 16, 20, and 24 of FIG. 1. Duplication of the input circuit of transformer 118 readily supplies the intermediate half-cycle sample pulses where half-cycle sampling is desirable. The intermediate half-cycle pulses may be of the same polarity as provided by sample pulse generator 70. However, where it is desirable to employ alternate polarity sampling pulses, alternate polarity, companion subsystems 70 and 78 may be employed.

The workpiece resistance signal is picked from a shunt comprising resistor 130 and a variable inductance 132. In many instances it is desirable to connect this shunt directly across workpiece 68 rather than to electrodes 62, 64 as shown. The function of variable inductance 132 is to suppress inductive tool effects due to the rate of change of current in the yoke of welder 60.

The voltage signal from resistor 130 is amplified by triodes 80, 82 and coupled via transformer 134 with the grid-cathode circuit of triode limiter 84. Included in the latter sub-circuit is a variable bias potential source 136 for selection of the limiting grid potential below which triode 84 is cut off, biased against conduction. Preferably, this grid bias is selected to prevent conduction by triode 84 during receipt of weld input pulse voltages. The consequent differential amplification effectively eliminates output signal dependence upon welding current waveform. The portions of the sample pulse resistance signal above the bias potential of triode 84, are amplified thereby and coupled through cathode follower 88 to gate 90.

The gate circuit 90 serves, selectively, to impress the resistance signal derived from the anode of triode 84 onto capacitor 92. The potential stored on capacitor 92 is consequently related directly to the sample pulse signal voltage and hence to the series resistances across the welding position.

Diode gate 90 is a conventional gate (Millman and Taub, Pulse and Digital Circuits, McGraw-Hill, 1956). Gate 90 is normally open-circuited because the potential developed on capacitor 140 biases diodes 142 against conduction. This bias voltage is overcome by a pulse induced in the secondary of enabling transformer 100 by the sample pulse voltage effect upon the anode circuit of triode limiter 84. Coupling between triode 84 and transformer 100 is via a pulse-shaping network, capacitor 146 and resistor 148, and amplifier 98. The gate is effectively short circuited during sample pulse transmission thereby impressing resistance signal potentials upon capacitor 92. Cathode follower 94 provides for a low impedance output proportional to the average, time integrated, resistance signal potential.

It will be apparent from the above discussions that while workpiece resistance is the controlling quantity to be detected, potential drop across the series resistance is actually the sensed parameter. Correction of this voltage signal for current variations could be accomplished, or an actual quotient derived for precise computation of resistance. However, it has been determined that these latter refinements are ordinarily not required for practical control applications. In fact, the change of current caused by a line voltage swings produces correction in the welding heat to offset deficiencies of the power supply. On the other hand, when the monitor is used to measure resistance directly, the current may be held constant by conventional controls and the output voltage can be made directly proportional to resistance.

While there have been described what are at present considered to be preferred embodiments of this invention, it will be obvious to those skilled in the art that various changes and modifications may be made without departing from the invention, and it is therefore aimed in the appended claims to cover all such changes and modifications as fall within the true spirit and scope of the invention.

What is claimed is:

1. In the resistance welding of workpieces by means of pulsating welding currents the method of monitoring resistance parameters of a welding position comprising:
  applying sample electrical pulses across the series resistances of the workpiece, which pulses are of a predetermined and controlled reference value, said value being of an electrical characteristic which is variable as a function of resistance and which pulses further are of such amplitude and duration as to have a heating effect less than the minimum heating effect required for fusion of the workpiece material;
  measuring between points substantially adjacent the respective electrode tips the variation in said pulses from said reference value and deriving from the magnitude of such variation a signal indicative of the value of the resistance between said electrode tips and utilizing the signal so obtained for adjusting the conditions controlling the welding of said workpiece.

2. In the resistance welding of workpieces by means of pulsating weld currents characterized by spaced pulses appearing in the secondary circuit of the welding transformer, the method of monitoring resistive parameters of a welding position comprising:

applying sample pulses of a predetermined and controlled amplitude which pulses are of such amplitude and duration as to provide a heating effect within said workpieces less than the minimum heating effect required for fusion of same, said pulses being applied directly across the series resistances of the workpiece by means independent of the supply means for said secondary circuit to produce a signal indicative of the resistances of the welding position;

controlling said sample pulses in relationship to the pulses of said pulsating weld currents to cause same to be interspersed between at least certain ones of the pulses of said pulsating weld currents, and energizing said welding transformer in a manner responsive to the strength of the signal and hence in accordance with the resistances of the welding position, whereby to relate the magnitude of the pulsating weld current to the magnitude of the resistance of said workpieces.

3. In the resistance welding of workpieces by means of pulsating weld currents characterized by spaced pulses appearing in the secondary circuit of the welding transformer, the method of monitoring resistive parameters of a welding position comprising:

injecting into the secondary circuit of the welding transformer sample pulses of a predetermined and controllable voltage, the amplitude and duration of said pulses being such as to provide for such pulses a heating effect less than that required for fusion of the workpiece material which pulses are independent of said pulsating weld currents and interspersed between at least certain ones of said pulses of said pulsating weld currents and deriving a signal proportional to the potential drop across the resistances of the welding position, and energizing said welding transformer in proportionate response to said signal in order to adjust the pulsating weld currents.

4. In the resistance welding of workpieces by means of pulsating weld currents, the method of monitoring resistive parameters of a welding position comprising applying sample pulses of a predetermined and controlled amplitude across the series resistances of the workpiece which pulses have minimum amplitude peak values substantially equal to or greater than the minimum amplitude voltages produced across the series resistances of the workpiece by the weld currents during welding and a heating effect less than the minimum heating effect required for fusion of the workpiece material, deriving a signal indicative of the resistances of the welding position and energizing welding means in a manner quantitatively related to the signal and, hence, in accordance with actual welding conditions of the series resistances of the welding position.

5. The method of claim 4 in which the weld current is supplied from an alternating current potential source to the primary winding of a transformer, the secondary winding of the transformer being connected to the welding position and the sampling pulses being supplied directly to the secondary winding of the transformer.

6. The method of claim 4 in which the weld current is supplied from an alternating potential source and the sample pulses are supplied in synchronism with said alternating potential source, one sample pulse being supplied during selected half-cycles of said source before flow of weld current during such half-cycle.

7. The method of claim 4 in which the weld current is supplied from an alternating potential source and the sample pulses are supplied in synchronism with said alternating potential source and are of alternating polarity.

8. A system for monitoring the series resistances across a welding position of a composite workpiece oriented to receive from the secondary winding of a welding transformer pulsating welding current inputs during a welding operation from an alternating current power source connected through a phase shift contactor to the primary winding of said welding transformer, which system comprises a sample pulse generator synchronized with the power source for generating sample pulses preceding selected welding pulse inputs to the workpiece, a sample pulse input circuit connected directly to and across the welding position for coupling the sample pulse generator across the series resistances of the workpiece welding position, pulse sensing means connected to points substantially adjacent the tips of said welding electrodes for generating a signal in response to sample pulses appearing in said series resistances and proportional to the resistance of the series resistances, contactor control means coupled for receiving said signal and further coupled to the contactor for altering welding pulse input to the workpiece according to said signal.

9. A system for monitoring the series resistances across a welding position of a composite workpiece oriented to receive from the secondary winding of a welding transformer pulsating welding current inputs during a welding operation from an alternating current power source connected through a phase shift contactor to the primary winding of said welding transformer, which system comprises a sample pulse generator synchronized with the power source for generating sample pulses preceding selected welding pulse inputs to the workpiece, a sample pulse input circuit independent of the circuit including said primary winding and means connecting same to points in the secondary circuit of the welding transformer on opposite sides of the workpiece for coupling the sample pulse generator across the series resistances of the workpiece welding position, pulse sensing means for generating a signal in response to sample pulses appearing in said series resistances and proportional to the resistance of the series resistances, contactor control means coupled for receiving said signal and further coupled to the contactor for altering welding pulse input to the workpiece according to said signal.

10. The circuit of claim 9 in which the pulse sensing means is connected to points substantially adjacent the tips of said welding electrodes.

11. A system for monitoring the series resistances across a welding position of a composite workpiece positioned to receive from the secondary winding of a welding transformer pulsation welding current inputs during a welding operation from an alternating current power source connected through a phase shift contactor to the primary winding of said welding transformer, which system comprises a sample pulse generator synchronized with the power source for generating sample pulses preceding selected welding pulse inputs to the workpiece, a sample pulse input circuit connected directly to and across the welding position for coupling the sample pulse generator across the series resistances of the workpiece welding position, a pulse sensing shunt connected in parallel with the workpiece, signalling means coupled with the pulse sensing shunt for generating a signal proportional to the resistance of the series resistances, the signal being generated by measuring the potentials developed across the series resistances of the workpiece welding position by the sample pulses, contactor control means coupled with said signalling means for receiving the signal and also coupled to the contactor for altering welding pulse inputs to the workpiece according to the signal.

12. A system for monitoring the series resistances across a welding position of a composite workpiece positioned to receive pulsation welding current inputs during a welding operation from a phase shift contactor controlled welder coupled with an alternating current power source, which system comprises a sample pulse generator coupled with the power source for generating sample pulses preceding selected welding pulse inputs to the workpiece, a sample pulse input circuit coupling the sample pulse generator across the series resistances of the workpiece welding position, a pulse sensing shunt connected in parallel with the workpiece, a potential signal generator coupled with the shunt generating a voltage signal proportional to pulse potentials developed across the series resistances of the workpiece welding position, sample pulse potential storage means, and means for selectively coupling said potential storage means and said potential signal generator during sample pulse periods.

13. A system for monitoring the series resistances across a welding position of a composite workpiece positioned to receive pulsation welding current inputs during a welding operation from a phase shift contactor controlled welder coupled with an alternating current power source, which system comprises a sample pulse generator coupled with the power source for generating sample pulses preceding each welding pulse input to the workpiece, a sample pulse input circuit coupling the sample pulse generator across the series resistances of the workpiece welding position, a pulse sensing shunt connected in parallel with the workpiece, a potential signal generator coupled with the shunt generating an amplified voltage signal proportional to pulse potentials developed across the series resistances of the workpiece welding position, sample pulse potential storage means, and gate means selectively coupling said potential storage means and said potential signal generator during sample pulse periods.

14. The system of claim 13 in which said potential signal generator includes means suppressing pulse potentials developed by welding inputs to the workpiece welding position.

15. The system of claim 14 in which said potential storage means is a capacitor and said gate means is a bidirectional gate.

16. A control system for resistance welding of a workpiece oriented to receive pulsation welding current inputs during a welding operation from a welder coupled with an alternating current power source, which system comprises a preweld monitor including a pulse generator coupled with the power source generating sample pulses preceding each welding pulse input to the workpiece, a sample pulse input circuit coupling the pulse generator across the series resistances of the welding position, a pulse sensing shunt connected in parallel with the workpiece, a potential signal generator coupled with the shunt generating an amplified voltage signal proportional to pulse potentials developed across the series resistances of the workpiece welding position, sample pulse potential storage means, gate means selectively coupling said potential storage means and said potential signal generator during sample pulse periods, and output signal means coupled with said storage means generating a low impedance preweld monitor output signal proportional to the stored potential, and contactor control means coupled between the preweld monitor and the welder altering welding pulse inputs to the workpiece according to the monitor output signal.

References Cited in the file of this patent
UNITED STATES PATENTS 2,848,595    Van Sciver _____ Aug. 19, 1958
3,068,350    Archer _____ Dec. 11, 1962